US012135225B1

(12) United States Patent
Xue et al.

(10) Patent No.: US 12,135,225 B1
(45) Date of Patent: Nov. 5, 2024

(54) SYSTEMS, METHODS, AND MEDIA FOR NEAR REAL-TIME ANOMALY EVENT DETECTION AND CLASSIFICATION WITH TREND CHANGE DETECTION FOR SMART WATER GRID OPERATION MANAGEMENT

(71) Applicant: Bentley Systems, Incorporated, Exton, PA (US)

(72) Inventors: Meng Xue, Singapore (SG); Zheng Yi Wu, Watertown, CT (US); Alvin Chew Wei Ze, Singapore (SG); Jianping Cai, Singapore (SG); Jocelyn Pok, Singapore (SG); Rony Kalfarisi, Singapore (SG)

(73) Assignee: Bentley Systems, Incorporated, Exton, PA (US)

( * ) Notice: Subject to any disclaimer, the term of this patent is extended or adjusted under 35 U.S.C. 154(b) by 107 days.

(21) Appl. No.: 18/098,419

(22) Filed: Jan. 18, 2023

(51) Int. Cl.
*G01D 4/00* (2006.01)
*E03B 7/07* (2006.01)

(52) U.S. Cl.
CPC ............ *G01D 4/002* (2013.01); *E03B 7/072* (2013.01)

(58) Field of Classification Search
None
See application file for complete search history.

(56) References Cited

U.S. PATENT DOCUMENTS

| 8,175,859 B1 | 5/2012 | Wu et al. |
| 8,635,051 B1* | 1/2014 | Wu ........................ G06N 3/126 703/9 |
| 10,060,835 B1 | 8/2018 | Wu et al. |
| 11,960,254 B1* | 4/2024 | Wu .................... G05B 13/0265 |

(Continued)

FOREIGN PATENT DOCUMENTS

| CN | 109791637 A | 5/2019 |
| WO | 2010131001 A1 | 11/2010 |

OTHER PUBLICATIONS

T.K. Chan et all., Review of Current Technologies and Proposed Intelligent Methodologies for Water Distributed Network Leakage Detection, Dec. 6, 2018, IEEE Access, vol. 6, pp. 78846-78867. DOI 10.1109/Access.2018.2885444 (Year: 2018).

(Continued)

*Primary Examiner* — Curtis A Kuntz
*Assistant Examiner* — Jerold B Murphy
(74) *Attorney, Agent, or Firm* — Cesari and McKenna, LLP

(57) ABSTRACT

Techniques are provided for near real-time anomaly event detection and classification with trend change detection for smart water grid operation management. In the first phase, a trend change is detected in each of one or more sensors by comparing new sensor data of a sensor with a historical trend pattern of the same sensor. In the second phase, and after the trend changes are detected, a valid event evaluation time window can be determined based on combining and analyzing the detected trend changes for flow and pressure (Continued)

sensors, e.g., at least one flow sensor and at least one pressure sensor from the same supply zone of the smart water grid. The valid event evaluation time window can be used with anomaly events that are detected in near-real time to classify the anomaly events in near-real time as valid, e.g., true anomaly events, or invalid, e.g., false alarms.

20 Claims, 10 Drawing Sheets

(56) References Cited

U.S. PATENT DOCUMENTS

| | | |
|---|---|---|
| 2007/0093306 A1 | 4/2007 | Magee et al. |
| 2017/0152648 A1 | 6/2017 | Hammond et al. |
| 2018/0181111 A1* | 6/2018 | Cussonneau ............ G06F 30/20 |
| 2019/0004484 A1 | 1/2019 | Cussonneau et al. |
| 2020/0250306 A1 | 8/2020 | Pendyala et al. |

OTHER PUBLICATIONS

Cleveland, Robert B., et al., "STL: A Seasonal-Trend Decomposition Procedure Based on Loess," Statistics Sweden, Journal of Official Statistics, vol. 6, No. 1, Mar. 1990, pp. 3-73.

Dziri, Jalal, et al., "Decision Tree and Support Vector Machine for Anomaly Detection in Water Distribution Networks," IEEE, 2020 International Wireless Communications and Mobile Computing (IWCMC), Limassol, Cyprus, Jun. 15-19, 2020, pp. 1320-1323.

Hochenbaum, Jordan, et al., "Automatic Anomaly Detection in the Cloud via Statistical Learning," arXiv, arXiv:1704.07706v1 [cs.LG], Apr. 24, 2017, pp. 1-13.

Hutton, Christopher, et al., "Real-Time Burst Detection in Water Distribution Systems Using a Bayesian Demand Forecasting Methodology," Elsevier Ltd., Elsevier, ScienceDirect, Procedia Engineering, $13^{th}$ Computer Control for Water Industry Conference, CCWI 2015, vol. 119, Dec. 2015, pp. 13-18.

Jung, Donghwi, et al., "Water Distribution System Burst Detection Using a Nonlinear Kalman Filter," American Society of Civil Engineers, ASCE, Journal of Water Resources Planning and Management, vol. 141, No. 5, May 2015, pp. 1-13.

Laucelli, Daniele, et al., "Detecting Anomalies in Water Distribution Networks Using EPR Modelling Paradigm," IWA Publishing, Journal of Hydroinformatics, available online on Dec. 12, 2015, vol. 18, No. 3, published on May 11, 2016, pp. 409-427.

Li, Qiao, et al., "Evolutionary Deep Learning with Extended Kalman Filter for Effective Prediction Modeling and Efficient Data Assimilation," American Society of Civil Engineers, ASCE, Journal of Computing in Civil Engineering, vol. 33, No. 3, May 2019, pp. 1-12.

Machine Translation of Shafiee in CN 109791637 A (Year: 2019).

Mounce, S.R., et al., "Development and Verification of an Online Artificial Intelligence System for Detection of Bursts and Other Abnormal Flows," American Society of Civil Engineers, ASCE, Journal of Water Resources Planning and Management, vol. 136, No. 3, May 1, 2010, pp. 309-318.

Mounce, Stephen R., et al., "Novelty Detection for Time Series Data Analysis in Water Distribution Systems Using Support Vector Machines," IWA Publishing, Journal of Hydroinformatics, vol. 13, No. 4, Nov. 6, 2010, pp. 672-686.

Mounce, S.R., et al., "Pattern Matching and Associative Artificial Neural Networks for Water Distribution System Time Series Data Analysis," IWA Publishing, Journal of Hydroinformatics, vol. 16, No. 3, Oct. 8, 2013, pp. 617-632.

Mounce, Stephen R., et al., "Sensor-Fusion of Hydraulic Data for Burst Detection and Location in a Treated Water Distribution System," Elsevier B.V., Elsevier, Information Fusion, vol. 4, Sep. 2003, pp. 217-229.

Mourad, M., et al., "A Method for Automatic Validation of Long Time Series of Data in Urban Hydrology," IWA Publishing, Water Science and Technology, vol. 45, No. 4-5, Feb. 2002, pp. 262-270.

Rodriguez, Alex, et al., "Clustering by Fast Search and Find of Density Peaks," Machine Learning, Science, vol. 344, Issue 6191, Jun. 27, 2014, pp. 1492-1496.

Romano, Michele, et al., "Automated Detection of Pipe Bursts and other Events in Water Distribution Systems," Manuscript Draft, Technical Paper, American Society of Civil Engineers, ASCE, Journal of Water Resources Planning and Management, Apr. 2014, pp. 1-36.

Romano, M., et al., "Evolutionary Algorithm and Expectation Maximization Strategies for Improved Detection of Pipe Bursts and Other Events in Water Distribution Systems," American Society of Civil Engineers, ASCE, Journal of Water Resources Planning and Management, vol. 140, No. 5, May 1, 2014, pp. 572-584.

Tao, Tao, et al., "Burst Detection Using an Artificial Immune Network in Water-Distribution Systems," American Society of Civil Engineers, ASCE, Journal of Water Resources Planning and Management, vol. 140, No. 10, Oct. 2014, pp. 1-10.

U.S. Appl. No. 16/796,462, filed Feb. 20, 2020 by Zheng Yi Wu, et al. for Evolutionary Deep Learning With Extended Kalman Filter for Modeling and Data Assimilation, pp. 1-40.

U.S. Appl. No. 17/693,208, filed Mar. 11, 2022 by Zheng Yi Wu, et al. for Anomaly Detection and Evaluation for Smart Water System Management, pp. 1-31.

Wen, Qingsong, et al., "RobustSTL: A Robust Seasonal-Trend Decomposition Algorithm for Long Time Series," arXiv, arXiv:1812.01767v1 [cs.LG], Dec. 5, 2018, pp. 1-9.

Wu, Yipeng, et al., "A Review of Data-Driven Approaches for Burst Detection in Water Distribution Systems," Informa UK limited, Taylor & Francis, Taylor & Francis Group, Urban Water Journal, vol. 14, No. 9, Feb. 10, 2017, pp. 972-983.

Wu, Yipeng, et al., "Distance-Based Burst Detection Using Multiple Pressure Sensors in District Metering Areas," American Society of Civil Engineers, ASCE, Journal of Water Resources Planning and Management, vol. 144, No. 11, Nov. 2018, pp. 1-6.

Wu, Yipeng, et al., "Using Correlation Between Data from Multiple Monitoring Sensors to Detect Bursts in Water Distribution Systems," American Society of Civil Engineers, ASCE, Journal of Water Resources Planning and Management, vol. 144, No. 2, Feb. 2018, pp. 1-10.

Wu, Zheng Yi, et al., "Comparing Deep Learning with Statistical Control Methods for Anomaly Detection," $1^{st}$ International WDSA/CCWI 2018 Joint Conference, Kingston, Ontario, Canada, Jul. 23-25, 2018, pp. 1-8.

Wu, Zheng Yi, et al., "Pressure-Dependent Leak Detection Model and Its Application to a District Water System," American Society of Civil Engineers, ASCE, Journal of Water Resources Planning and Management, vol. 136, No. 1, Jan. 1, 2010, pp. 116-128.

Wu, Zheng Yi, "Unified Parameter Optimisation Approach for Leakage Detection and Extended-Period Simulation Model Calibration," Taylor & Francis, Taylor & Francis Group, Urban Water Journal, vol. 6, No. 1, Apr. 7, 2009, pp. 53-67.

Ye, Guoliang, et al., "Weighted Least Squares with Expectation-Maximization Algorithm for Burst Detection in U.K. Water Distribution Systems," American Society of Civil Engineers, ASCE, Journal of Water Resources Planning and Management, vol. 140, No. 4, Apr. 1, 2014, pp. 417-424.

Zhang, Qingzhou, et al., "Leakage Zone Identification in Large-Scale Water Distribution \Systems Using Multiclass Support Vector Machines," American Society of Civil Engineers, ASCE, Journal of Water Resources Planning and Management, vol. 142, Issue 11, Jun. 14, 2016, pp. 1-15.

* cited by examiner

SYSTEMS, METHODS, AND MEDIA FOR NEAR REAL-TIME ANOMALY EVENT DETECTION AND CLASSIFICATION WITH TREND CHANGE DETECTION FOR SMART WATER GRID OPERATION MANAGEMENT

BACKGROUND

Technical Field

The present disclosure relates generally to computer-based infrastructure software, and more specifically to techniques for near real-time anomaly event detection and classification with trend change detection for smart water grid operation management.

Background Information

With the continual advancement of emerging technologies, smart sensors and data loggers are increasingly deployed for monitoring the operation and management of water distribution systems. Large amount of data are collected to facilitate smart water grid operation and management in urban cities, e.g., Singapore. An important aspect of smart water grid operation and management is the detection of anomaly events that can be captured via observed abnormalities in flow and pressure time series data.

With traditional approaches, only flows at the inlet of a system or district metered areas (DMA) are recorded. The average flow rate between 2 AM and 4 AM, known as the Minimum Night Flow (MNF) hours, is typically adopted for evaluating the occurrences of new pipe bursts due to high pressure, i.e. low flow, in underground pipes which has a greater tendency to result in burst events. Therefore, if the recorded flows from the most recent MNF hours are significantly greater than that of one or more previous days, then it is likely that new pipe bursts have occurred in a DMA. One advantage is that the MNF method is simple and easy to implement. However, the MNF method can also hinder engineers from leveraging use of large time-series datasets to detect the anomaly events that occur during non-MNF hours.

Anomaly detection is the identification of rare items, events, or observations, which invoke suspicions by differing significantly from the benchmark data (flow and pressure). Over the last decades, much research work has been conducted for developing anomaly detection methods. Four conventional types of anomaly detection methods for water distribution networks include—prediction-classification (PC) approaches, clustering algorithms (CA), model calibration (MC), and statistical process control (SPC) methods. However, each of these approaches has their drawbacks.

The PC approaches construct a prediction model using historical data. The prediction model can then be used to forecast the flows and/or pressures for normal conditions. If the prediction is out of predefined bounds, it is determined that an anomaly event has been detected or occurred. However, the PC method requires a vast amount of historical data, when compared to other approaches, to establish or train an effective prediction model.

The CA approach constructs a classifier by using data features that are selected and processed or automatically learned from a historical dataset without anomaly events. After being constructed, the classifier can be applied to new data to detect anomaly events. One such conventional CA approach includes 3 key systematic phases—(1) Prediction, (2) Classification, and (3) Correction. The prediction phase forecasts flow profile(s) in multiple DMAs, while the classification stage introduces different thresholds to enhance the robustness of the predictive modeling phase, e.g., first phase. The correction phase leverages the predicted flow values to perform outlier detection within emulated DMAs by achieving a high true positive rate (e.g., >85%) and a low false negative rate (e.g., <0.2%) of the simulated leak events. Although this CA approach works well for large pipe bursts, it can produce many false alarms for quasi-bursts such that a sophisticated alarm rule is required.

The MC approach simulates data with a calibrated model and subsequently compares the simulated data with historical data to detect leakage. One such MC approach includes modelling the spatiotemporal variations in a water distribution's demand pattern due to either leakages or system evolution. By doing so, modelers can set up reference baselines for different calibrated parameters, and then compare simulated data with historical values to determine if leakages have occurred in the system. However, the MC approach requires that the model be calibrated frequently such that the model accurately represents the water distribution network. Frequently calibrating the model consumes processing resources and also makes it more difficult to perform near real-time anomaly detection.

The SPC approach is widely used for quality assurance and quality control (QA/QC) in the manufacturing industry. The SPC approach can be defined as the use of statistical techniques to control a process by a control chart that helps to detect an unusual or anomaly event such as a very high or low observation compared with "normal" process performance. One such conventional SPC approach includes the construction of reference subsequence libraries for flow, i.e. water demand, data. Newly collected subsequence in DMAs, of generic characteristics, are then compared with the constructed reference libraries to detect burst events via comparing their shape similarities.

Other notable examples of applying statistical methods include: (1) use of principal component analysis (PCA) to extract the most critical information from monitoring data for assimilation into statistical models which can quantitatively represent the dynamic behavior of water distribution networks for burst detections; (2) integration of SPC algorithms with tailor-made detection characteristics pertaining to specific utility companies to identify anomalies in water distribution networks by comparing with historic mean and variance values under normal conditions for various hydraulic parameters; and (3) exploitation of seasonal fluctuations of water consumptions (daily and night components) with respect to inflow time-series data of the water distribution network for detecting possible leakage events in the water distribution network. The SPC approach is generally limited to stationary time series data. However, flows and pressures vary periodically, e.g. daily, weekly, and monthly. Therefore, the nonstationary time series data must be decomposed to meet the stationarity as required by SPC approaches.

Another SPC approach applies SPC methods to time series data to detect outliers. The outliers are then classified into anomaly events by adjusting heuristic rules of outlier temporal adjacency. However, this SPC approach typically results in the detection of many false alarms (i.e., false positive events). False alarms are not desirable in practice because they result in increased labor and cost in field investigations, e.g., evaluating the physical water distribution network based on the detected anomaly events and then learning that they are false alarm based on the evaluation.

Therefore, what is needed is an anomaly detection and classification technique that can detect and classify anomaly events in near real-time without suffering the above described drawbacks, e.g., false alarms.

SUMMARY

Techniques are provided for near real-time anomaly event detection and classification with trend change detection for smart water grid operation management. Specifically, and as will be described in further detail below, the one or more embodiments as described herein may incorporate trend change detection in two phases. In the first phase, a trend change is detected in each of one or more sensors by comparing new sensor data of a sensor with a historical trend pattern of the same sensor. In the second phase, and after the trend changes are detected, a valid event evaluation time window can be determined based on combining and analyzing the detected trend changes for flow and pressure sensors, e.g., at least one flow sensor and at least one pressure sensor from the same supply zone of the smart water grid. The valid event evaluation time window can be used with anomaly events that are detected in near-real time to classify the anomaly events in near-real time as valid (e.g., likely to be a true anomaly event) or invalid (e.g., likely to be a false alarm) according to the one or more embodiments as described herein.

In an embodiment, a processor, e.g., an anomaly detection module executed by the processor, may establish a historical trend pattern for each sensor of the smart water grid utilizing historical sensor data for the same sensor. Specifically, the processor may analyze the values of the sensor data (e.g., flow data or pressure data) obtained by a sensor (e.g., a flow sensor or a pressure sensor) over a predefined time period. Based on the analysis of the past sensor data for the sensor, the processor may establish a historical trend pattern for the sensor by determining the significant changes in the sensor data (e.g., flow data or pressure data) over the predefined time period. The established historical trend pattern for each sensor of the smart water grid may be stored in a refence database.

New sensor data for one or more sensors of the smart water grid may be received to perform near real-time anomaly detection and classification according to the one or more embodiments as described herein. Specifically, and after preprocessing, the processor may analyze the new sensor data to identify one or more anomaly events. For example, the processor may use a statistical process control (SPC) method to identify the one or more anomaly events. The processor may also determine deviations from the new sensor data and the historical trend patterns of the sensors in the smart water grid. For example, the new sensor data may include new flow sensor data obtained from a flow sensor from a supply zone of the smart water grid. The new sensor data may also include new pressure sensor data obtained from a pressure sensor from the same supply zone. The processor may compare the new flow sensor data with the historical trend pattern of the flow sensor that is stored in the reference database. The processor may also compare the new pressure sensor data with the historical trend pattern of the pressure sensor that is stored in the reference database. Based on the comparisons, the processor may determine the deviations.

Based on the determined deviations, the processor may determine a valid event evaluation time window. A valid event evaluation time window may be a time frame in which the determined deviations for the flow sensor and the pressure sensor overlap in time, and also where there is at least one flow increasing trend and at least one pressure decreasing trend in the overlapping time.

The processor may then use the valid event evaluation time window to classify the detected anomaly events in near real-time. If detected anomaly events fall within the event evaluation time window, the processor may classify the anomaly events as valid and likely to be true anomaly events. If detected anomaly events fall outside the event evaluation time window, the processor may classify the anomaly events as invalid and likely to be false alarms.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
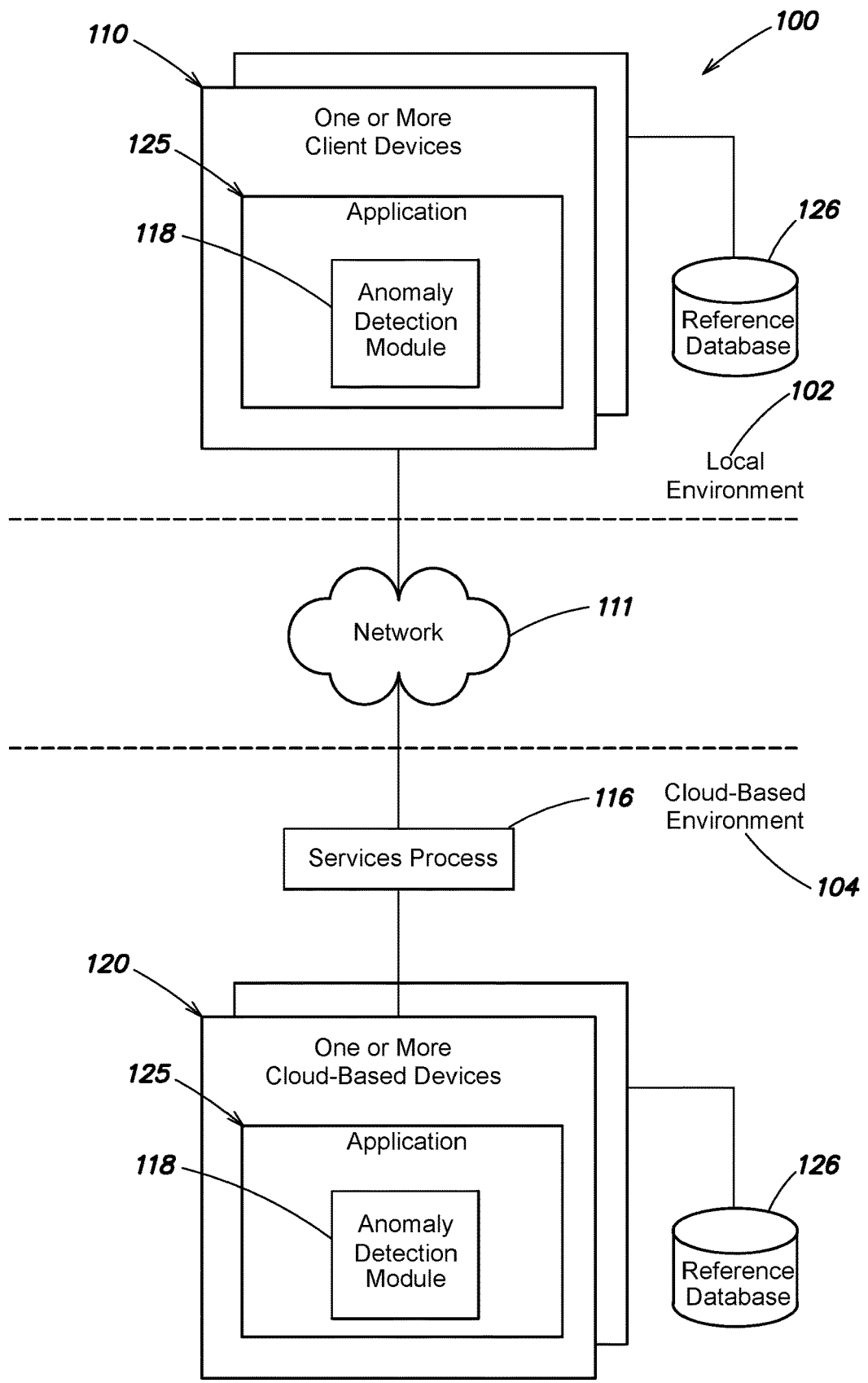
FIG. 1 is a high-level block diagram of an example architecture for near real-time anomaly event detection and classification with trend change detection for smart water grid operation management according to one or more embodiments described herein.

FIG. 1 is a high-level block diagram of an example architecture 100 for near real-time anomaly event detection and classification with trend change detection for smart water grid operation management according to one or more embodiments described herein. The architecture 100 may be divided into a local environment 102 and a cloud-based environment 104. The local environment may include one or more local client devices 110 that are local to an end-user. The cloud-based environment 104 may include one or more cloud-based client devices 120 that are remote from the end-user and that are accessible to the end-user via a network 111 (e.g., the Internet).

Reference database 126 may be accessed by local client devices 110 and may store models of smart water grids. In an embodiment, a smart water grid is a water distribution network with one or more sensors and/or data loggers, hereinafter collectively referred to as sensors. In an embodiment, a model of a smart water grid includes (1) a graphical model of the smart water grid with graphical objects that represent the components of the smart water grid, and/or (2) data that defines or describes the characteristics and attributes of the smart water grid and its components.

Reference database 126 may store a table that include historical data for each of the sensors and/or historical trend pattern determined for each of the. Additionally, new sensor data may be added to the table as will be described in further detail below. Reference database 126 may also store values, data structures, and/or any data that is generated or accessed according to the one or more embodiments as described herein. The reference database 126 may be located in the local environment 102, the cloud-based environment 104, or replicated in both the local environment 102 and cloud-based environment 104. Although FIG. 1 depicts reference database 126 being separate from client devices 110 and cloud-based devices 120, it is expressly contemplated that the client devices 110 and cloud-based devices 120 may include reference database 126. In addition or alternatively to being stored on database 126, it is expressly contemplated that the models of smart water grids may be stored on client devices 110 and/or cloud base devices 120.

Each computing device, e.g., one or more local client devices 110 and one or more cloud-based client devices 120, may include processors, memory/storage, a display screen, and other hardware (not shown) for executing software/modules, storing data, and/or displaying information.

A local client device 110 may provide a variety of user interfaces and non-processing intensive functions. For example, a local client device 110 may provide a user interface, e.g., a graphical user interface and/or a command line interface, for receiving user input and displaying output according to the one or more embodiments described herein. A services process 116 may coordinate operation of the one or more local client devices 110 and the one or more cloud-based client devices 120 such that, for example, the one or more local client devices 110 may communicate with and access the one or more cloud-based client devices 120 via network 111.

The one or more client devices 110 and/or one or more cloud-based client devices 120 may store and execute application 125. In an embodiment, the application 125 may be infrastructure modeling software that may execute a model of the smart water grid to simulate a behavior and/or operation of the real-world smart water grid. Application 125 may, in near real-time, detect and classify anomaly events with trend change detection as will be described in further detail below. In an embodiment, an identified anomaly event may correspond to a physical location in the real-world smart water grid.

The one or more local client devices 110 may download and store application 125 according to the one or more embodiments described herein. In addition or alternatively, the one or more local client devices 110 may utilize one or more user interfaces to access, via services process 116, the application 125 that is stored on the one or more cloud-based client devices 120 according to the one or more embodiments described herein. As such, the application 125 may be stored on local client devices 110, cloud-based devices 120, or replicated and stored on both client devices 110 and cloud-based devices 120.

The application 125 may include an anomaly detection module 118. The anomaly detection module 118 may detect and classify anomaly events, in near real-time, with trend change detection as will be described in further detail below. Specifically, and as will be described in further detail below, the anomaly detection module 118 may determine a historical trend pattern for each sensor of the smart water grid. New sensor data may be received for one or more sensors, and the anomaly detection module 118 may determine deviations between the new sensor data and the historical trend patterns corresponding to the sensors. The anomaly detection module 118 may determine a valid event evaluation time window based on an overlapping time period for the deviations, and a determination that there is at least one flow increasing trend and at least one pressure decreasing trend. If detected anomaly events fall within the event evaluation time window, the anomaly detection module 118 may classify the anomaly events as valid and likely to be true anomaly events. If detected anomaly events fall outside the event evaluation time window, the anomaly detection module 118 may classify the anomaly events as invalid and likely to be false alarms.

It is expressly contemplated that the anomaly detection module 118 may be hardware, software, or a combination thereof. In an embodiment, the processor (not shown) of a local client device 110 may be coupled to the memory (not shown) of the local client device 110, wherein the processor is configured to execute the decimation module. In addition or alternatively, the processor (not shown) of a cloud-based client device 120 may be coupled to the memory (not shown) of the cloud-based client device 120, wherein the processor is configured to execute the anomaly detection module 118.

Figure 2:
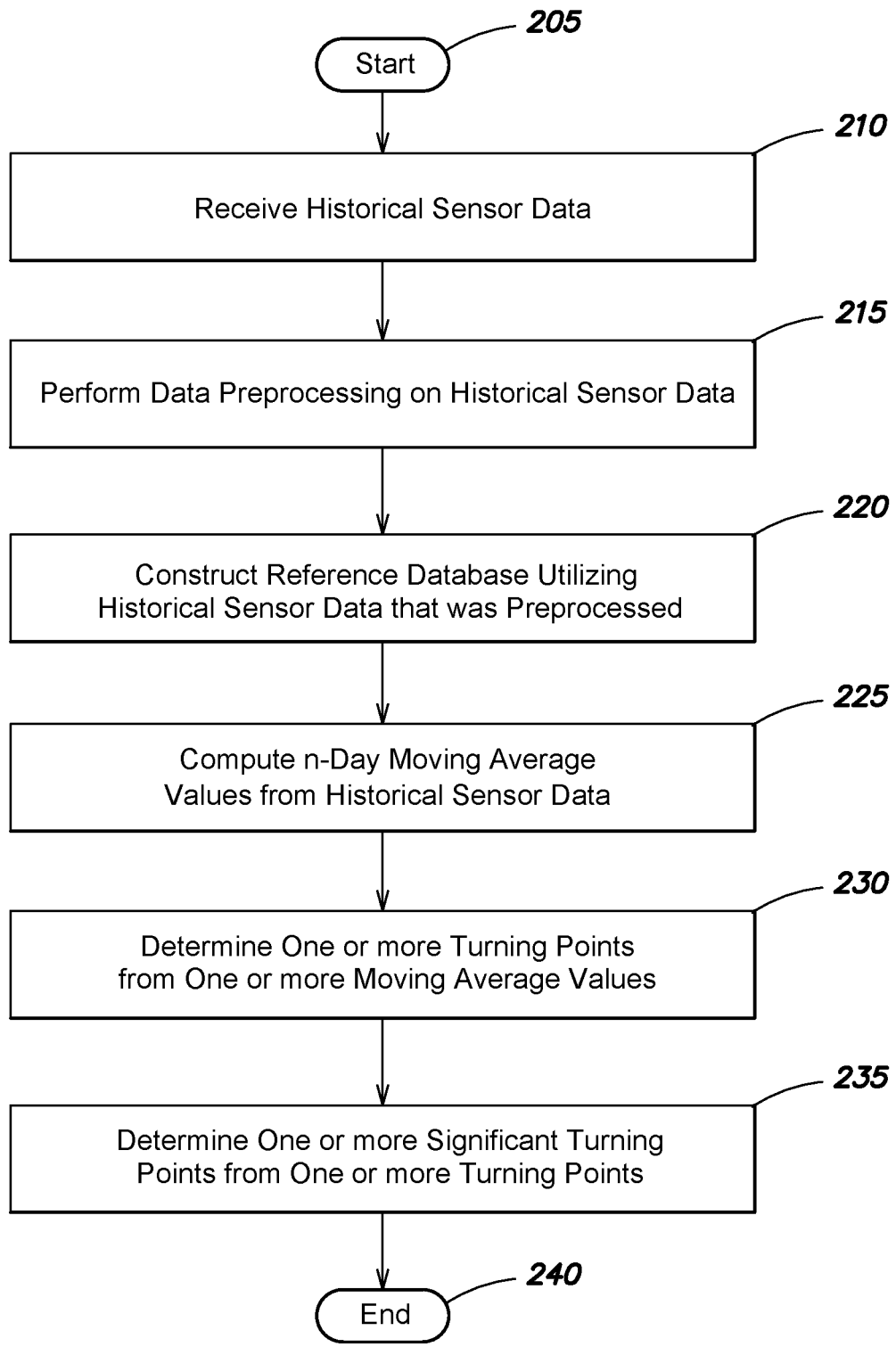
FIG. 2 is a flow diagram of a sequence of steps for establishing a historical trend pattern for each sensor of a smart water grid according to the one or more embodiments as described herein.

FIG. 2 is a flow diagram of a sequence of steps for establishing a historical trend pattern for each sensor of a smart water grid according to the one or more embodiments as described herein. The historical trend patterns may be utilized, as will be described in further detail below with reference to FIGS. 6 through 10, to determine a valid event evaluation time window such that anomaly events can be classified as either valid or invalid.

The procedure 200 starts at step 205 and continues to step 210 where the anomaly detection module 118 receives historical sensor data. In an embodiment, the historical sensor data may be data obtained from pressures sensors and flow sensors, e.g., flow meters, that are distributed throughout the smart water grid. For example, each supply zone of the smart water grid may include at least one pressure and at least one flow sensor. In an embodiment, the historical sensor data may be collected over a plurality of previous days. There may be no limitation on the maximum number of previous days over which the historical sensor data may be collected. However, the number of previous days, n, of historical data must be at least the number of days utilized to compute a moving average window size for establishing a historical trend pattern as described in further detail below with reference to step 225.

The procedure continues to step 215, and the anomaly detection module 118 performs data preprocessing on the received historical sensor data, i.e., raw data. Specifically, by its nature, the raw sensor data can exhibit many issues. Such issues may include, but are not limited to, missing data records, duplicate data records, irregular time steps, various sensor failures, etc. Therefore, it is important and necessary to preprocess the raw sensor data, e.g., data records, before applying an anomaly classification technique that will be described in further detail below.

In an embodiment, the anomaly detection module 118 may preprocess missing data records, e.g., missing raw sensor data records, using corresponding values from a last period. For example, each missing record may be associated with a different time step. The anomaly detection module 118 may fill the missing records with the values from a last period and the same time steps if the number of missing records is less than a threshold value of missing time steps. In an embodiment, the threshold value of missing time steps may be user-defined or preconfigured. If the number of missing records is equal to or greater than the threshold value of missing time steps, the anomaly detection module 118 may remove the data records of the whole operation cycle, e.g., 24 hours, from the historical sensor data.

For duplicate data records having a same time step, the anomaly detection module 118 may maintain the first record with the same time step and may delete the remaining duplicate data records.

Time series data is typically recorded in a fixed time interval. For example, let it be assumed that the historical sensor data is recorded in time steps of 5 minutes. As such, there is 5 minutes between two consecutive data records. If data is recorded out of the time step, the recorded data may be considered as irregular time step data and the anomaly detection module 118 may fill the data record at the expected time step by the interpolation of the data records at adjacent times.

A failed sensor may cause data records to have extremely large or small values. In an embodiment, the anomaly detection module 118 may determine that a data record is a sensor failure data record if the value does not fall within an upper bound limit and a lower bound limit. The upper bound limit and/or the lower bound limit may be user-defined or preconfigured. Additionally, failed sensors may cause data records to have a constant single value. In an embodiment, the anomaly detection module 118 may determine that multiple records are sensor failure records if the values of the multiple data records remain constant (e.g., same value) for a threshold number of time steps. The threshold number of time steps may be user-defined or preconfigured.

The anomaly detection module 118 may remove the sensor failure records if the number of sensor failure records is greater than a maximum threshold error value. The anomaly detection module 118 may correct the sensor failure records with the data records of the same time steps over a most recent period if the number of sensor failure records is less than or equal to the maximum threshold error value. In an embodiment, the maximum threshold error value may be user-defined or preconfigured.

The procedure continues to step 220, and the anomaly detection module 118 constructs a reference database 126 utilizing the historical sensor data that was preprocessed. In an embodiment, the reference database 126 may be post relational database that stores the historical data that was preprocessed. In an embodiment, the reference database 126 may include a table with a row for each sensor, and each column may include a different value (e.g., pressure value, flow value, etc.) corresponding to the sensor for a different time step.

The procedure continues to step 225, and the anomaly detection module 118 computes n-day moving average values based on daily accumulated values from the historical sensor data of the reference database 126. In an embodiment, sensor data is collected in short intervals, such as 5 minutes. When the historical sensor data is collected in such short time intervals, there can be too many fluctuations through the raw values of the sensor data collected for the day. To eliminate such fluctuations, the anomaly detection module 118 may accumulate, e.g., sum, the raw values for each day such that there is only 1 data point, e.g., an accumulated value, for each day.

Figure 3:
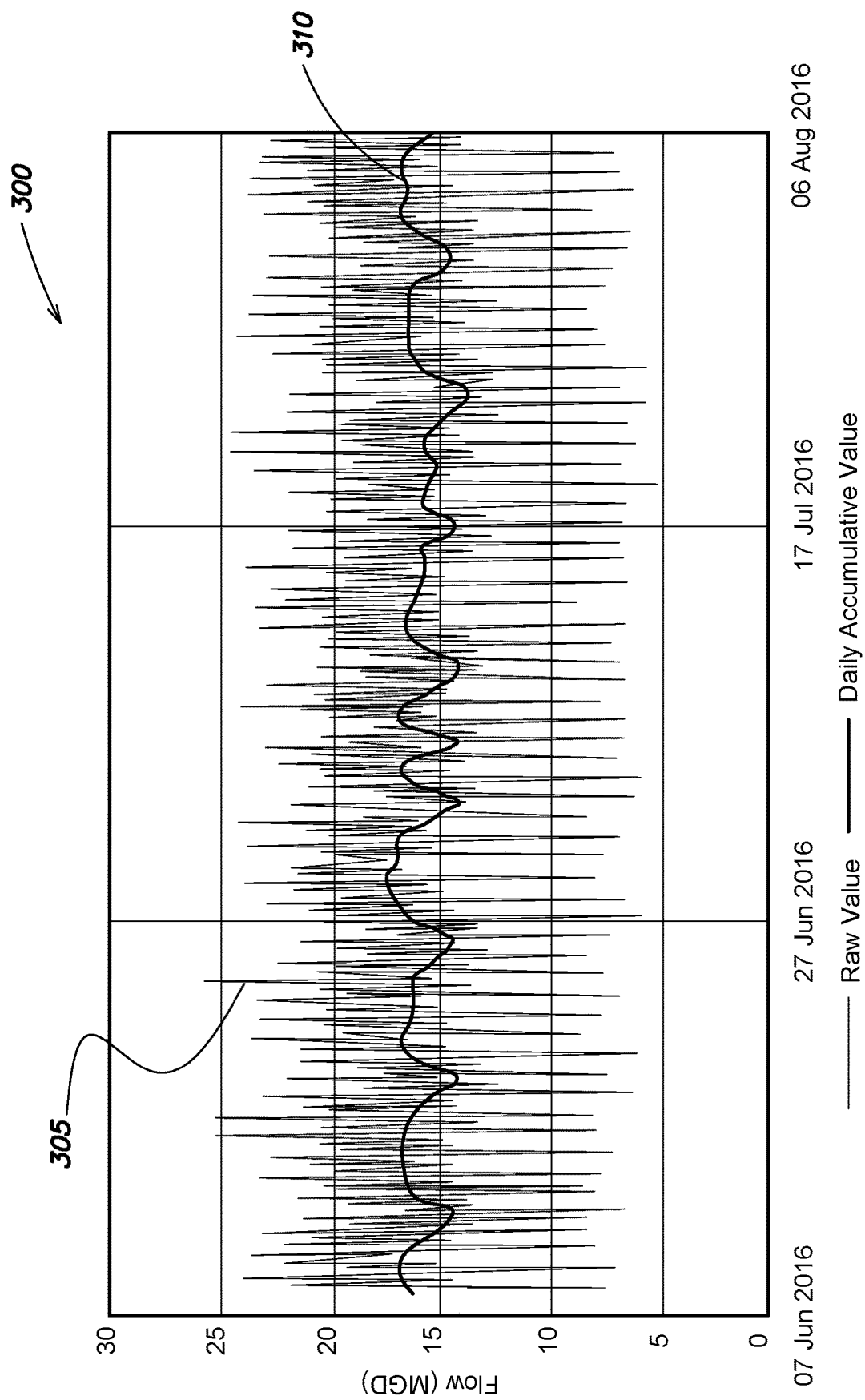
FIG. 3 is an illustration of an example plot including raw sensor data values and accumulated values according to the one or more embodiments as described herein.

FIG. 3 is an illustration of an example plot 300 including raw sensor data values and accumulated values according to the one or more embodiments as described herein. The y-axis of plot 300 represents the amount of flow of water in terms of million gallons per day (MGD), while the x-axis represents time in terms of days. The raw values for flow of FIG. 3 are recorded at 5 minute intervals. As illustrated in plot 300, the raw values 305 for flow fluctuate on each day over the time span as indicated on the x-axis. To eliminate the fluctuations as depicted in FIG. 3, the anomaly detection module 118 accumulates the raw values of each day to compute an accumulation value for the same day. As illustrated in plot 300, line 310 represents the accumulated values that include a single accumulated value for each day over the time span as indicated on the x-axis. Although, plot 300 depicts raw values 305 and accumulated values 310 for a flow sensor, it is expressly contemplated that similar raw values and accumulated values are produced and can be plotted for a pressure sensor.

To further smooth the data series over n days, the anomaly detection module 118 may apply a moving average window to the accumulated values to compute a moving average value for each day ($MA_d$). In an embodiment, the size of the moving average window may be user-defined or preconfigured.

Figure 4:
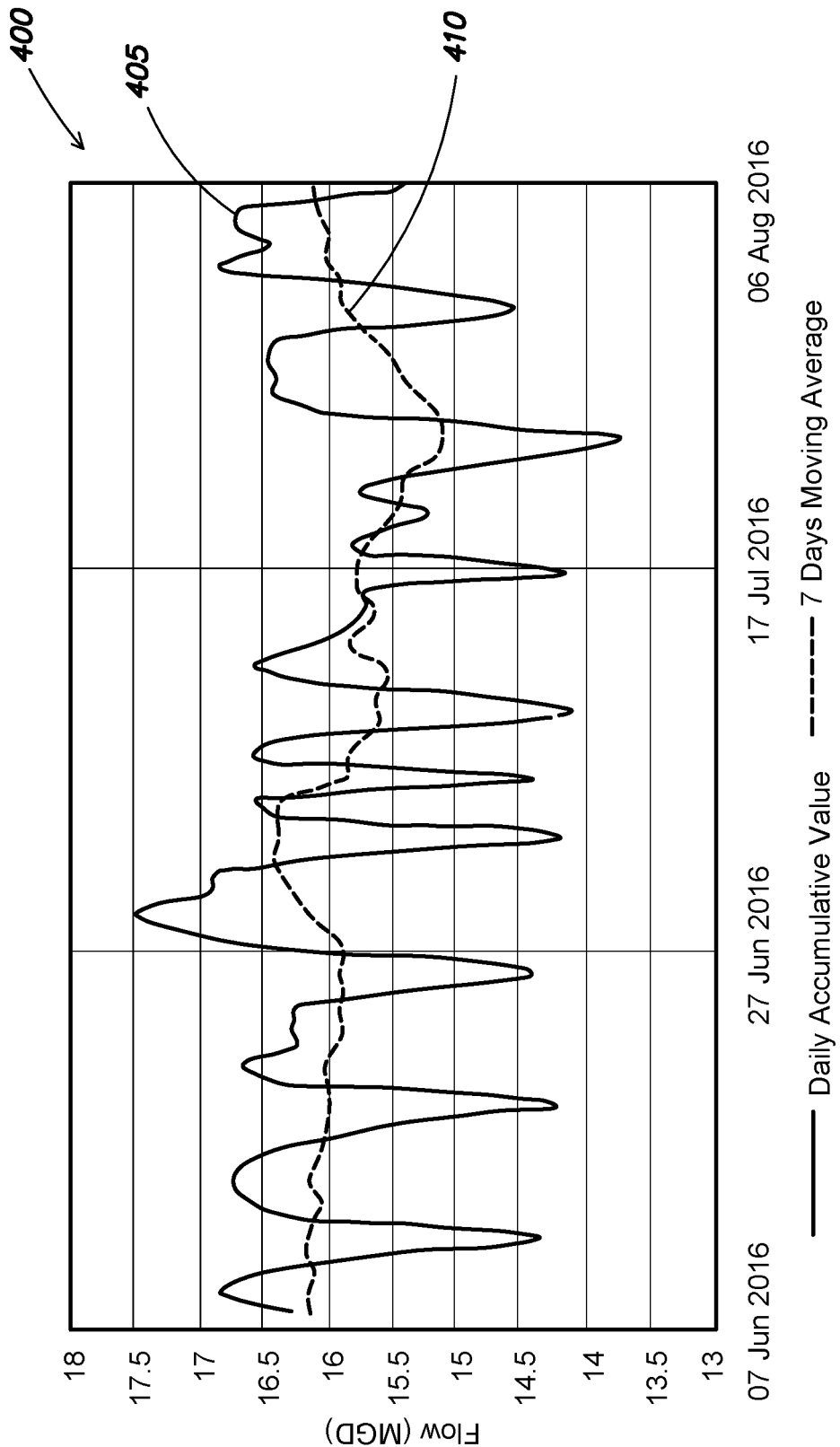
FIG. 4 is an illustration of an example plot including accumulated values and moving average values according to the one or more embodiments as described herein.

FIG. 4 is an illustration of an example plot 400 including accumulated values and moving average values according to the one or more embodiments as described herein. The y-axis of plot 400 represents the amount of flow of water in terms of MGD, while the x-axis represents time in terms of days. In the example of FIG. 4, the window size is 7 days. As such, the anomaly detection module 118 computes the $MA_d$ for each day based on an average of 7 accumulated values. As illustrated in plot 400, line 405 represents the daily accumulated values for each day over the time span as indicated on the x-axis. Line 410 represents the of $MAs_d$ 410 for each day over the time span as indicated on the x-axis. Although, the plot 400 depicts the accumulated values and $MAs_d$ for a flow sensor, it is expressly contemplated that similar accumulated values and moving average values are produced and can be plotted for a pressure sensor.

The procedure continues to step 230 and the anomaly detection module 118 determines one or more turning points from the one or more moving average values. In an embodiment, a turning point is a moving average value that is determined to represent a threshold amount of change from its previous moving average value. For example, let it be assumed that a selected moving average value is identified as a selected point and the immediate previous moving average value is identified as a previous point. In an embodiment, the anomaly detection module 118 may calculate a first-order difference of the selected point and may also calculate a first-order difference of the previous point. The anomaly detection module 118 may determine that the selected point is a turning point if the product of the first-order difference of the selected point and the first-order difference of the previous point is less than 0. The anomaly detection module 118 may perform a similar computation to determine if each of the moving average values are turning points.

The procedure continues to step 235 and the anomaly detection module 118 determines which of the determined turning points is a significant turning point. A significant turning point may be a mean average value that has already been determined to be a turning point, and has been further determined to represent a threshold amount of change from a previously determined significant turning point. Thus, a significant turning point represents a threshold amount of change that is an addition to the amount of change represented by the turning point. In an embodiment, a turning point is determined to be a significant turning point based on the utilization of a percentage threshold value in conjunction with the previous determined significant turning point. The percentage threshold value may be user-defined or preconfigured. In an embodiment, the first turning point determined for all the moving average values may be utilized as a reference point. The anomaly detection module 118 may then calculate an upper bound ($TV_{upper}$) and a lower bound ($TV_{lower}$) as follows:

$$TV_{upper} = TV_{ref} * (1 + TV_{threshold})$$

$$TV_{lower} = TV_{ref} * (1 - TV_{threshold})$$

where $TV_{ref}$ is the reference point and $TV_{threshold}$ is the percentage threshold value. If the next turning point, e.g., the second identified turning point, is within $TV_{upper}$ and $TV_{lower}$, the anomaly detection module 118 may determine that the next turning point is not a significant turning point. If the next turning point is not within $TV_{upper}$ and $TV_{lower}$, the anomaly detection module 118 may determine that the next turning point is a significant turning point. That is, the second mean average value not being within $TV_{upper}$ and $TV_{lower}$ indicates that the second means average value is significantly different from the first means average value.

Figure 5:
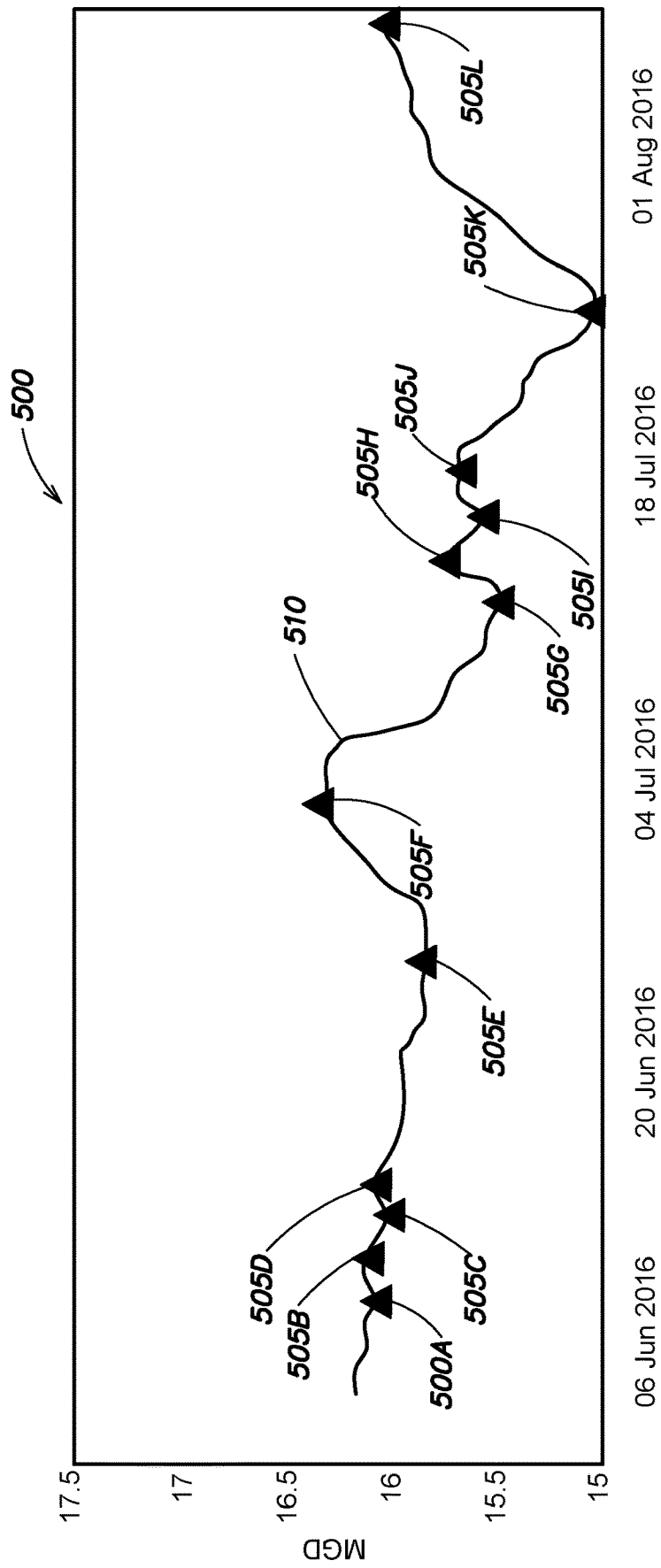
FIG. 5 is an illustration of an example plot including moving average values and significant turning points according to the one or more embodiments as described herein.

FIG. 5 is an illustration of an example plot 500 including moving average values and significant turning points according to the one or more embodiments as described herein. The y-axis of plot 500 represents the amount of flow of water in terms of MGD, while the x-axis represents time in terms of days. The plot 500 includes line 510 that represents the 7-day moving average values and includes a 7-day moving average value for each day over the time span as indicated on the x-axis. Plot 500 also includes determined significant turning points 505A-505L that are identified with triangles. Subsequently, the anomaly detection module 118 may use the newly determined significant turning point as the reference point for determining if other, i.e., future, turning points are significant turning points. As such, all the identified turning points at step 235 are evaluated to determine if they are significant turning points. The last determined significant turning point will be used as the reference point for determining if an identified turning point for new sensor data is a significant turning point as will be described in further detail below with reference to FIG. 6.

By determining the significant turning points based on the historical sensor data for each sensor, the anomaly detection module 118 establishes the historical trend pattern for each sensor. The historical trend pattern for each sensor of the smart water grid may be determined in a similar manner as described above. The historical trend pattern for each sensor may be stored in reference database 126. For example, each row of a table in reference database 126 may correspond to a different sensor. The historical trend pattern for a particular sensor be stored in a particular column and the row corresponding to the particular sensor. The procedure 200 then ends at step 240.

As will be described in further detail below with reference to FIGS. 6 through 10, new sensor data from sensors may be utilized with the historical trend patterns of the same sensors to perform near real-time anomaly detection and classification. Specifically, significant turning points of the new sensor data may be utilized with historical trend patterns to determine an event evaluation time window. The event evaluation time window may be defined as the overlapping time period for at least one flow significant turning point and at least one pressure significant turning point for at least one flow sensor and at least one pressure sensor in a same supply zone. The event evaluation time window may be valid if overlapping time period includes at least one increasing flow trend and at least decreasing pressure trend. If an anomaly event falls within the valid event evaluation time window, the anomaly event may be classified as valid and likely to be a true anomaly event. If the anomaly event falls outside the valid event evaluation time window, the anomaly event may be classified as invalid and likely to be a false alarm.

Figure 6:
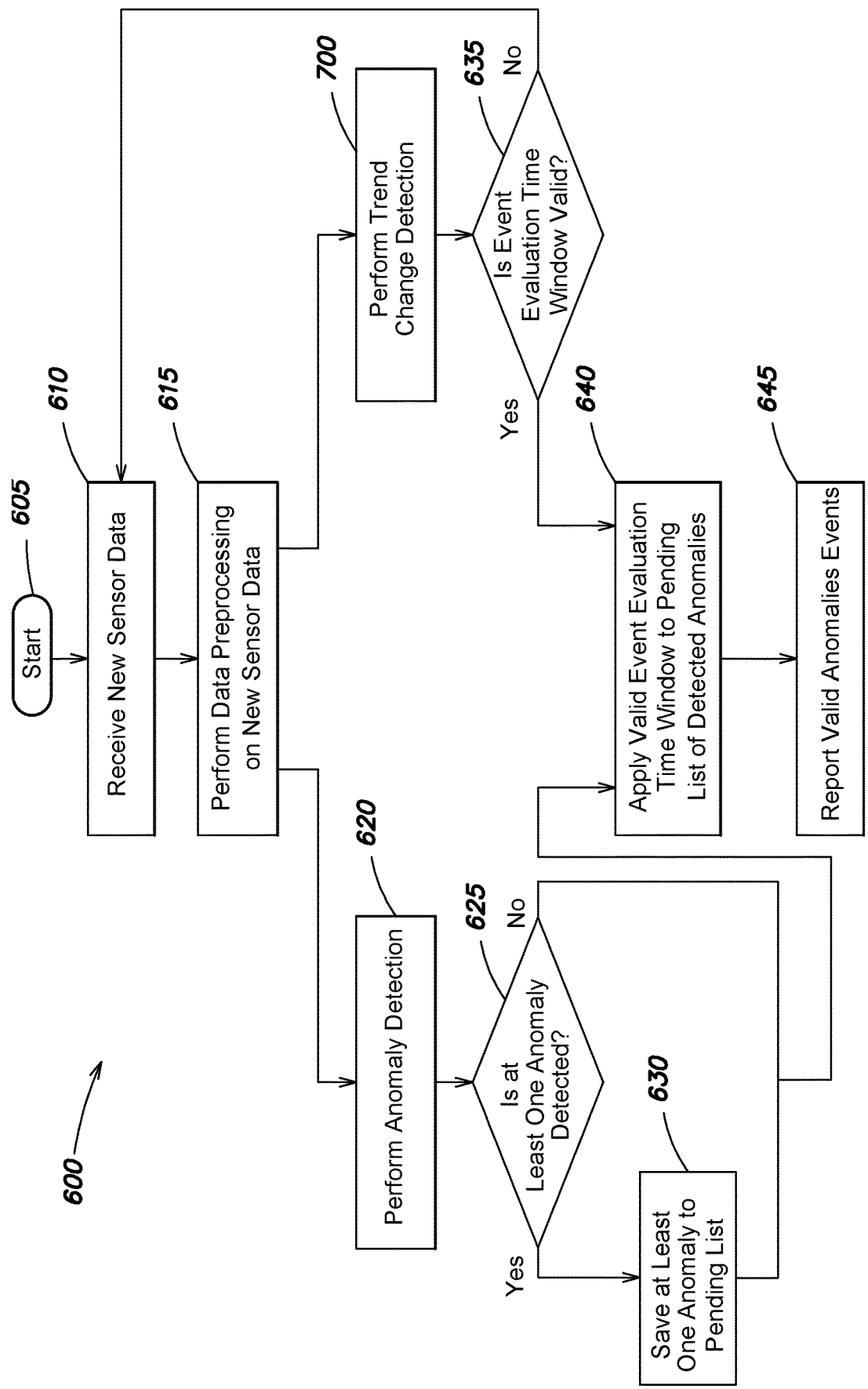
FIG. 6 is a flow diagram of a sequence of steps for near-real time anomaly event detection and classification according to the one or more embodiments as described herein.

FIG. 6 is a flow diagram of a sequence of steps for near-real time anomaly event detection and classification according to the one or more embodiments as described herein. Procedure 600 starts at step 605 and continues to step 610 where anomaly detection module 118 receives new sensor data. For example, the new sensor data may include new flow sensor data from at least one flow sensor and new pressure sensor data from at least one pressure sensor. In an embodiment, the at least one flow sensor and at least one pressure sensor monitor a same supply zone of the smart water grid. Alternatively, the new sensor data may be from all sensors of the smart water grid or any set of sensors from a portion of the smart water grid. In an embodiment, the new sensor data may be received on-demand or on a predefined schedule. For example, the new sensor data may be received every six hours, daily, etc.

In an embodiment, the new sensor data is raw flow and pressure time-series data. Although the example as described herein may at times refer to sensors of a single supply zone, it is expressly understood that procedure 600 may be applicable to new sensor data for each sensor of the smart water grid. As such, the reference to sensors of a single supply zone is for illustrative purposes only.

The procedure continues to step 615 and the anomaly detection module 118 performs data preprocessing on the new sensor data. The anomaly detection module 118 may preprocess the new sensor data in a similar manner as described above with reference to step 215 of FIG. 2. The procedure continues from step 615 to both steps 620 and 700. At step 620, the anomaly detection module 118 performs anomaly detection for the new sensor data. In an embodiment, any of a variety of different anomaly detection techniques may be utilized to detect anomaly events in the new sensor data after preprocessing. For example, the anomaly detection module 118 may implement a statistical process control (SPC) method to detect anomaly events in the new sensor data. To perform the SPC method on the new sensor data after preprocessing, the anomaly detection module 118 may perform data decomposition and outlier detection.

Data decomposition—to effectively apply data analytical methods such as an SPC method for outlier detection, it is essential to ensure that time series data is stationary. By stationary, it is meant that the mean and variance of the dataset do not change over time. Since typical flow time-series data and typical pressure time-series data contain daily, weekly, and monthly seasonality, it is identified as nonstationary time-series profile data. Therefore, flow time-series data and pressure time-series data are required to be first decomposed to eliminate the influence of seasonality. In an embodiment, the anomaly detection module 118 implements a Seasonal-Trend decomposition procedure based on Loess (STL) to decompose raw flow and pressure time-series data, e.g., the new sensor data after preprocessing.

Outlier detection—after the seasonality component is removed from time series data (e.g., flow and pressure time-series data for pressure and flow sensors in the same zone), the anomaly detection module 118 may apply multiple statistical methods to perform outlier detection. In an embodiment, the multiple statistical methods may be user selected or preconfigured. In an embodiment, the multiple statistical methods include X-bar, Exponential Weighted Moving Average (EWMA), and Cumulative Sum (CUSUM). In an embodiment, X-bar, EMWA, and CUSUM are trained models that can be used to implement the statistical methods.

The detected outliers may be the anomaly events identified in the new sensor data. As will be described in further detail below, each of the anomaly events identified in the new sensor data can be classified as either valid (e.g., likely to be a true anomaly event) or invalid (e.g., likely to be a false alarm) according to the one or more embodiments as described herein.

A true anomaly event can, for example, be an unauthorized water usage, leakage, a pipe burst, etc. Such true anomaly events cause increasing inflow into a supply zone and also cause pressure drops in at least some sensor locations within the supply zone. Thus, a true anomaly event is detected and classified with two important characteristics of High-Flow (HF) sensor anomaly (HF outliers) and Low-Pressure (LP) sensor anomaly (LP outliers) within a same time window. Therefore, and as will be described in further detail below, the anomaly module 118 can determine an event evaluation time window when there is a flow increasing trend and a pressure decreasing trend. It is expected that the anomaly events within this event evaluation time window will highly likely be genuine, i.e., true anomaly events, while the anomaly events outside the event evaluation time window are likely to be false alarms and can be filtered out or ignored.

Referring back to FIG. 6, and after performing anomaly detection at step 620, the procedure continues to step 625 and the anomaly detection module 118 determines if at least one anomaly event was detected. If so, the procedure continues to step 630 and the detected anomaly events are saved to a pending list of anomaly events. If at least one anomaly event is not detected at step 625 or after the at least one anomaly event is saved to the pending list at step 630, the procedure continues to step 640. Step 640 is performed if an event evaluation time window is determined to be valid. Therefore, and before discussing step 640, trend change detection with the new sensor data to determine an event evaluation time window will be discussed.

Figure 7:
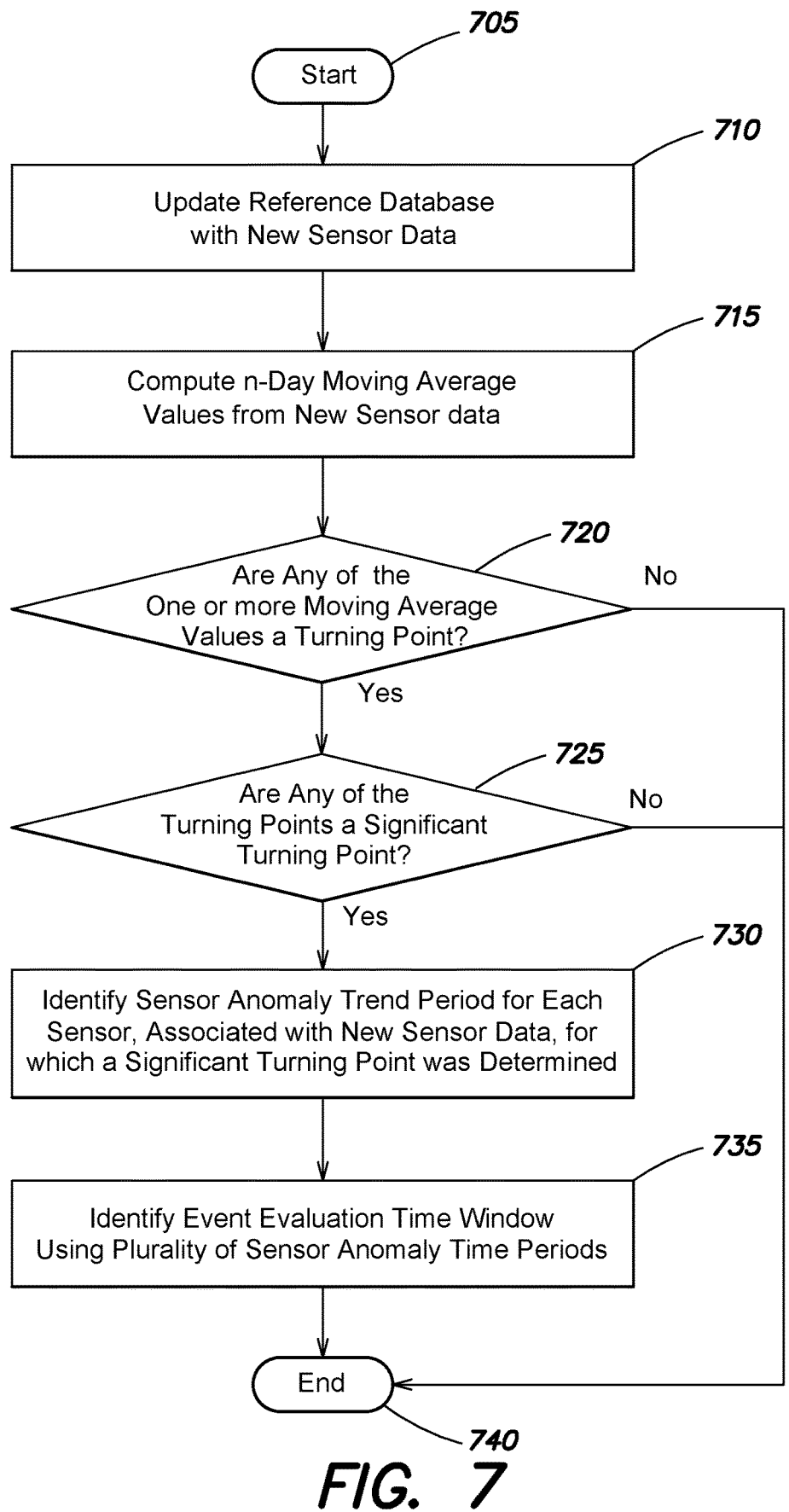
FIG. 7 is a flow diagram of a sequence of steps for trend change detection according to the one or more embodiments as described herein.

Specifically, and referring back to FIG. 6, procedure 600 proceeds from step 615 to step 700. At step 700, the anomaly detection module 118 performs trend change detection with the new sensor data. FIG. 7 is a flow diagram of a sequence of steps for trend change detection according to the one or more embodiments as described herein. As will be described in further detail below, performing the trend change detection of FIG. 7 results in determining event evaluation time windows that can be used to filter anomaly event such that anomaly events can be classified as likely to be true anomaly events or likely to be false alarms.

The procedure 700 starts at step 705 and continues to step 710 where the anomaly detection module 118 updates the reference database 126 with the new sensor data. In this example, the anomaly detection module 118 updates the reference database 126 with the new sensor data from the at least one pressure sensor and the at least one flow sensor from the same supply zone after preprocessing. Specifically, the anomaly module 118 may identify the rows of the reference database 126 that corresponds to the pressure and flow sensors and add the new sensor data to particular columns that are associated with the time steps of the new sensor data.

The procedure continues to step 715 and the anomaly detection module 118 computes n-day moving average values based on daily accumulated values from the new sensor data. The anomaly detection module 118 may compute the n-day moving average values in a similar manner as described above with reference to step 225 of FIG. 2.

The procedure continues to step 720 and the anomaly detection module 118 determines if any of the moving average values a turning point. The anomaly detection module 118 may determine if any of the one or more moving average values are turning points in a similar manner as described above with reference to step 230 of FIG. 2. If none of the or more moving average values are turning points, the procedure may end at step 740. If one or more moving average values are turning points, the anomaly detection module 118 may record, in reference database 126, a timestamp (e.g., date) corresponding to when a moving average value is determined to be a turning point. The timestamp corresponding to when a moving average value is determined to be a turning point may be referred to as an actual turning time.

The procedure continues from step 720 to step 725 and the anomaly detection module 118 determines if any of the turning points a significant turning point. Since the reference database 126 is updated in near-real time with new sensor data, it is not possible to immediately determine a significant turning point of the new sensor unless additional new sensor data for the next few days is received. That is, there needs to be sufficient amount of new sensor data such that the moving average values can be calculated so that the determinations can be made regarding whether significant turning points exists within the new sensor data. Therefore, there will be delay or lag in confirming whether a turning point is a significant turning point.

The anomaly detection module 118 may determine if each identified turning point is a significant turning point in a similar manner as described above with reference to step 235 of FIG. 2. Specifically, the last significant turning point identified in the historical sensor data will be used as the reference point for calculating $TV_{upper}$ and $TV_{lower}$. A first moving average value, corresponding to a turning point of the new sensor data, that is not within $TV_{upper}$ and $TV_{lower}$ is a significant turning point and used as the new reference point. As such, the latest determined significant turning point becomes the new reference point for determining whether future turning points are significant turning points. The anomaly detection module 118 may record, in reference database 126, a timestamp (e.g., day) corresponding to when a turning point is determined to be a significant turning point. The timestamp corresponding to when a turning point is determined to be a significant turning point may be referred to as a detected time.

Figure 8:
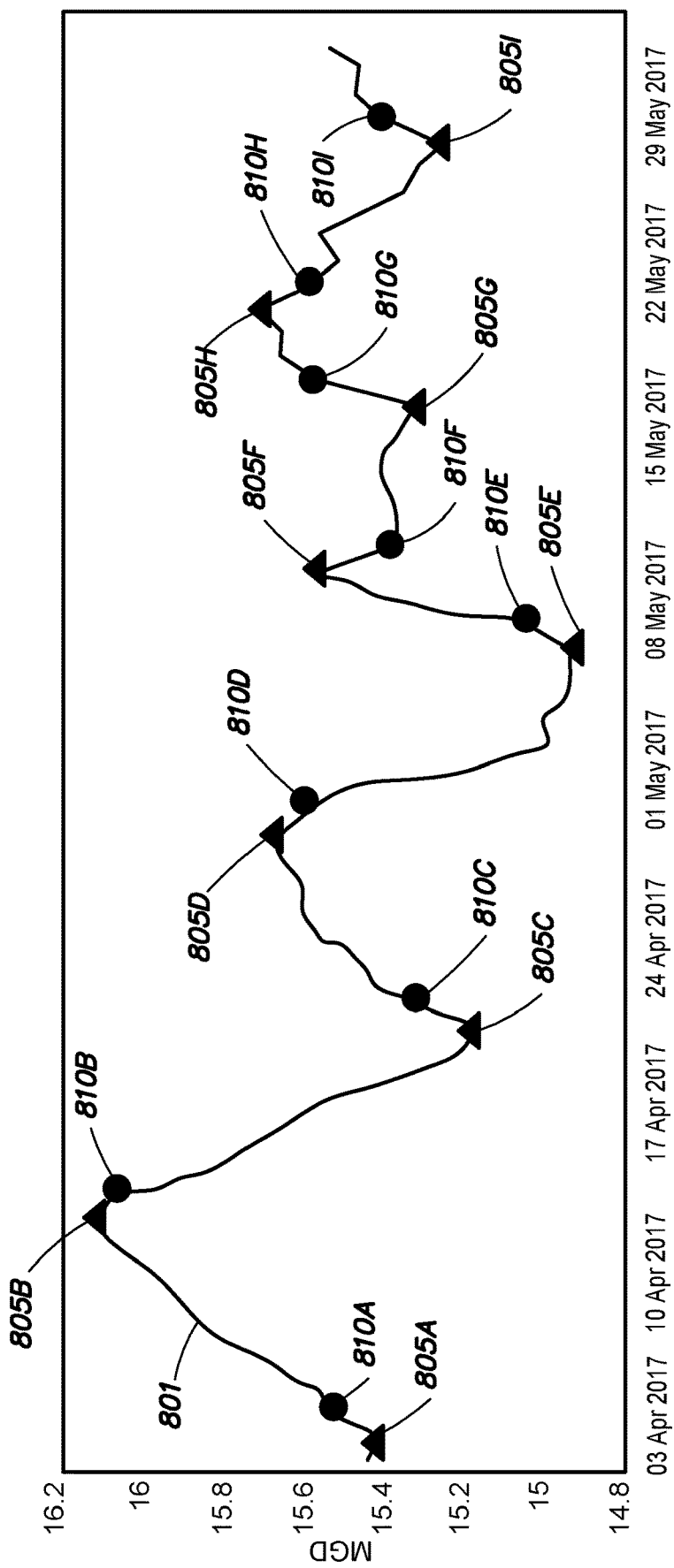
FIG. 8 is an illustration of an example plot including moving average values for new sensor data with determined significant turning points according to the one or more embodiments ad described herein.

FIG. 8 is an is an illustration of an example plot 800 including moving average values for new sensor data with determined significant turning points according to the one or more embodiments ad described herein. The y-axis of plot 800 represents the amount of flow of water in terms of MGD, while the x-axis represents time in terms of days. The line 801 represents the moving average values for different days for the time span indicated on the x-axis. Each of triangles 805A-805I represents a date, actual turning times, on which a particular moving average value is determined to be a turning point. Each of circle 810A-810I represents a date, e.g., detected time, on which the directly preceding turning point was confirmed to be a significant turning point. Accordingly, there is an actual turning time and a corresponding detected time for each of nine significant turning points for the new sensor data of FIG. 8.

Referring back to FIG. 7, if no turning points are determined to be significant turning points, the procedure 700 continues from 725 and ends at step 740. However, if one or more turning points are determined to be significant turning points, the procedure continues from step 725 to step 730. At step 730, the anomaly detection module 118 identifies a sensor anomaly trend period for each sensor, associated with the new sensor data, for which a significant turning point was determined.

For this example, the new sensor data is obtained for the flow and pressure sensors of a single supply zone of a smart water grid. In an embodiment, a time window (TW) may be utilized as a minimum period to identify the sensor anomaly trend period for each sensor. In an embodiment, TW may be user-defined or preconfigured. As previously explained, each significant turning point for sensor i has a corresponding actual turning time and a detected time. For example, and as depicted in FIG. 8, each of the nine significant turning points has an actual turning time and a detected time.

If the duration from the actual turning time ($AT_i$) to the detected time ($DT_i$) is greater than TW, the anomaly detection module 118 determines that the sensor anomaly trend period for the sensor i is from ($DT_i$-TW) to ($DT_i$+TW). If the duration from ATdi to $DT_i$ is less than or equal to TW, the anomaly detection module 118 determines that the sensor anomaly trend period for sensor i is from $AT_i$ to ($DT_i$+TW). As an example, let it be assumed that a particular significant turning point for a particular sensor i has an $AT_i$ of March 7 and a $DT_i$ of March 8. As such, the duration from $AT_i$ of March 7 and a $DT_i$ of March 8 is one day. Further, in this example, let it be assumed that the TW is 3 days. Since the duration of 1 day is less than the TW of 3 days, the anomaly detection module 118 determines that the senor anomy trend period for the particular sensor is March 7 to March 11 (e.g., March 8+3).

As such, the anomaly detection module 118 determines the sensor anomaly trend period for each significant turning point for each sensor. Referring to FIG. 8, the anomaly detection module 118 determines a sensor anomaly trend period for each of the nine significant turning points utilizing the corresponding $AT_i$ and $DT_i$.

Referring back to FIG. 7, the procedure continues from step 730 to step 735 and the anomaly detection module 118 identifies an event evaluation time window using a plurality of sensor anomaly time periods. In an embodiment, the anomaly detection module 118 determines the event evaluation time window as the common period between the sensor anomaly trend periods for flow and pressure. That is, the event evaluation time window is the portion of the flow anomaly trend period and the pressure anomaly trend period that overlap. An event evaluation time window is valid if—(1) the event evaluation time window (e.g., overlapping portion) includes at least one flow increasing trend, and (2) the event evaluation time window includes at least one pressure decreasing trend.

Figure 9:
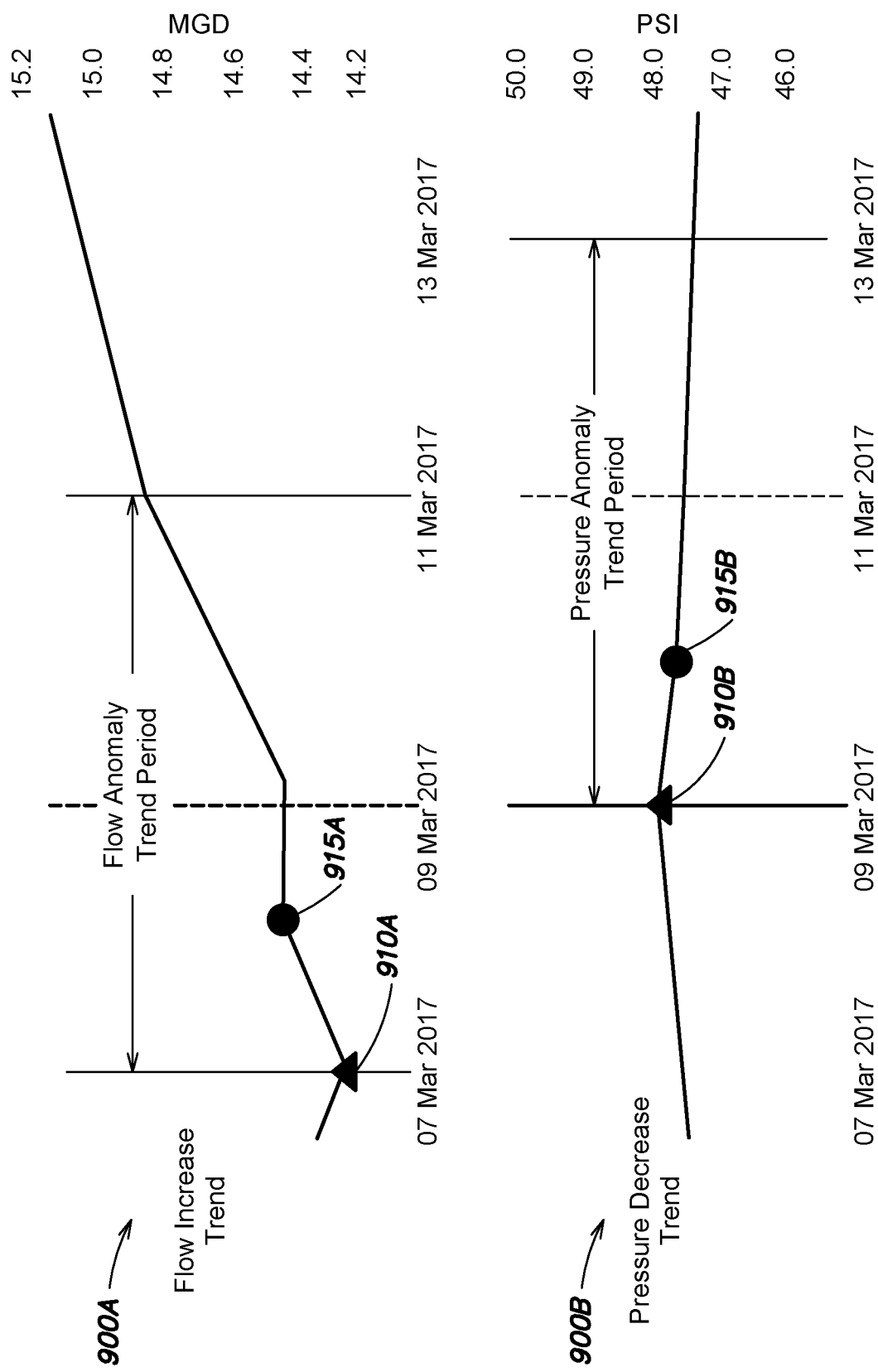
FIG. 9 is an illustration of example plots for determining a valid event evaluation according to the one or more embodiments as described herein.

FIG. 9 is an illustration of example plots 900A and 900B for determining a valid event evaluation according to the one or more embodiments as described herein. For this example, let it be assumed that the new flow sensor data and new pressure sensor data are from, respectively, a flow sensor and a pressure sensor in the same supply zone of the smart water grid.

The y-axis of plot 900A represents the amount of flow of water in terms of MGD, while the x-axis represents time in terms of days. Line 905A indicates the moving average values for the flow of water into the supply zone that is detected by the flow sensor in March of 2017. The significant turning point is identified by the triangle 910A and the circle 915A that indicate the $AT_i$ and $DT_i$, respectively, on plot 900A. For this example, the flow anomaly trend period for the significant turning point is Mar. 7, 2017, to Mar. 11, 2017. The flow anomaly trend period is indicated by solid lines in plot 900A.

The y-axis of plot 900B represents the amount of pressure in terms of PSI, while the x-axis represents time in terms of days. Line 905B indicates the moving average values for the pressure in the pipes to the supply zone that is detected by the pressure sensor in March of 2017. The significant turning point is identified by the triangle 910B and the circle 915B that indicate the $AT_i$ and $DT_i$, respectively, on plot 900B. For this example, the flow anomaly trend period for the significant turning point is Mar. 9, 2017, to Mar. 13, 2017. The pressure anomaly trend period is indicated by solid lines in plot 900B.

As depicted in FIG. 9, the flow anomaly trend period and the pressure anomaly trend period overlap from Mar. 9, 2017, to Mar. 11, 2017. As such, the anomaly detection module 118 determines that the event evaluation time window is from Mar. 9, 2017, to Mar. 11, 2017. The event evaluation time window is indicated in FIG. 9 by dashed lines. Specifically, the dashed line in plot 900A marks the start of the event evaluation time window while the dashed line in plot 900B marks the end of the event evaluation time window. As depicted in plot 900A, there is at least one flow increasing trend between Mar. 9, 2017, and Mar. 11, 2017. As depicted in plot 900B, there is at least one pressure decreasing trend between Mar. 9, 2017, and Mar. 11, 2017. Because there is at least one flow increasing trend and at least one pressure decreasing trend in the event evaluation time window of Mar. 9, 2017, to March 110, 2017, the anomaly detection module 118 determines that the event evaluation time window is valid.

For simplicity and easy of understanding, the example of FIG. 9 only includes two significant turning points for only two different sensors. However, it is expressly contemplated that the event evaluation time windows can be determined for a plurality of different significant turning points for any number of a plurality of sensors in a similar manner as described herein.

As will be described in further detail below, the valid evaluation time windows can then be utilized to classify each anomaly event as valid (e.g., likely to be a true anomaly event) or invalid (e.g., likely to be a false alarm).

After determining the event evaluation time window at step 735, the procedure ends at step 740. Referring back to FIG. 6, the procedure continues from step 700 to step 635. At step 635, the anomaly detection module 118 determines if the event evaluation time window is valid. As explained above with reference to FIG. 9, an event evaluation time window is valid if (1) the event evaluation time window includes at least one flow increasing trend, and (2) the event evaluation time window includes at least one pressure decreasing trend. The event evaluation time window may be invalid if the two criteria are not satisfied, if no turning points are identified in step 720, or if no significant turning points are identified in step 725.

If the event evaluation time window is not valid, the procedure continues from step 635 to step 610 and the anomaly detection module 118 waits for new sensor data to be received. For example, if new sensor data is received every six hours, the anomaly detection module 118 may wait for the new sensor data to be received on the next six hour interval at step 610.

If the event evaluation time window is valid at step 635, the procedure continues to step 640. At step 640, the anomaly detection module 118 applies the valid event evaluation time window to the pending list of anomaly events. For example, the pending list of anomaly events may include the anomaly events that were detected in the new sensor data at step 620.

Figure 10:
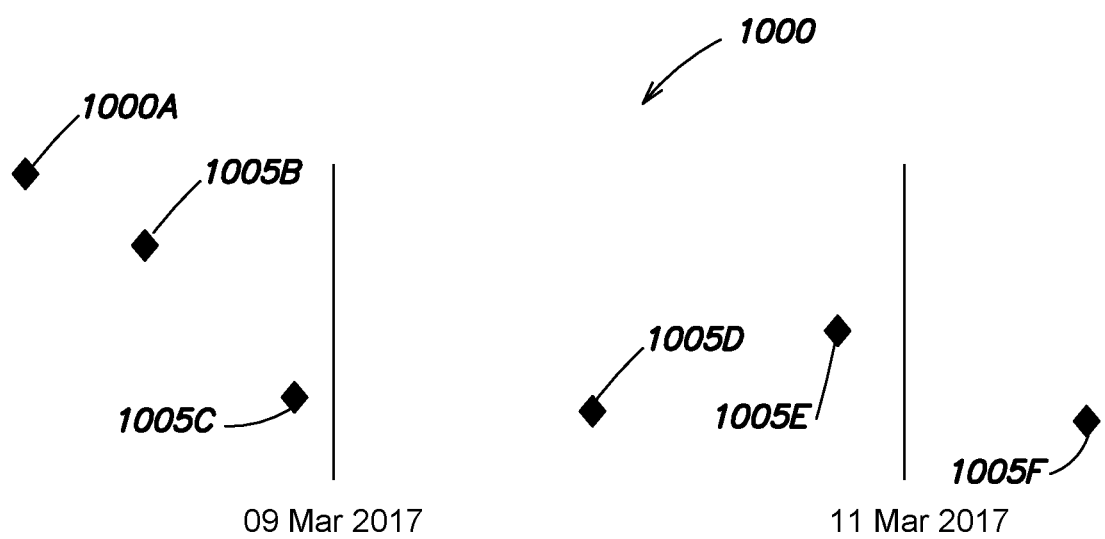
FIG. 10 is an illustration of example of a valid event evaluation time window 1000 for classifying anomaly events as valid or invalid according to the one or more embodiments as described herein.

FIG. 10 is an illustration of example of a valid event evaluation time window 1000 for classifying anomaly events as valid or invalid according to the one or more embodiments as described herein. The valid event evaluation time window 1000 may be based on the flow and pressure anomaly trends of FIG. 9. As such, and in this example, the valid event evaluation time window 1000 starts on Mar. 9, 2017, and ends on Mar. 11, 2017. FIG. 10 further includes anomaly events 1005A-1005F that occur at different points throughout march. For example, anomaly events 1005A-1005F may be detected from the new sensor data at step 620 of FIG. 6. As depicted in FIG. 10, anomaly event 1005D and 1005E occur on days that fall within the valid event evaluation time window. Therefore, the anomaly detection module 118 determines that anomaly events 1005D and 1005E are valid and are thus likely to be true anomaly events. Anomaly events 1005A-1005C and 1005F occur on days that fall outside the valid event evaluation time window. Therefore, the anomaly detection module 118 determines that anomaly events 1005A-1005C and 1005F are not valid and are likely to be false alarms.

As explained above, the valid event evaluation time window is a time frame that has the at least the following main characteristics—(1) significant deviations from historical trend patterns are detected for both pressure and flow, (2) at least one flow increasing trend is identified, and (3) at least one pressure decreasing trend is identified. These main characteristics are typically present when a true anomaly event occurs in a smart water grid. As such, using the valid event evaluation time period with the anomaly events allows the one or more embodiments described herein to filter out, i.e., ignore, those anomaly events that occur at times when the main characteristics are not present. Accordingly, the anomaly events that occur at time when the main characteristics are present are deemed to be valid, i.e., highly likely to be true anomaly events.

Because anomaly events are more accurately identified using model data of a smart water grid when compared to conventional systems, the one or more embodiments described herein encounter less simulation errors and/or simulation inaccuracies when compared to conventional approaches. Therefore, the one or more embodiments as described herein model anomaly events more accurately when compared to conventional methods/approaches. As such, the one or more embodiments as described herein provide an improvement in the technological field of computer-based infrastructure modeling. e.g., executable models that when executed simulate the true operational behavior of smart water grids.

Referring back to FIG. 6, the procedure 600 continues from step 640 to 645 and the anomaly detection module 118 reports the valid anomaly events. The anomaly detection module 118 may display the valid anomaly events on a display screen of the client device 110. For example, the application 125 may display the model of the smart water grid, and the anomaly detection module 118 may display the valid anomaly events in a list that is on top of or adjacent to the model of the smart water grid. In addition or alternatively, the anomaly detection module 118 may display the valid anomaly events at a location in the model (e.g., pipe, valve, etc.) where the valid anomaly event is suspected to occur. For example, the location in the model may correspond to a physical location of the smart water grid. From step 645, the procedure reverts back to step 610 to repeat procedure 600 for new sensor data that is, for example, received for the next time interval (e.g., six hours, daily, etc.).

It should be understood that a wide variety of adaptations and modifications may be made to the techniques. For examples, the steps of the flow diagrams as described herein may be performed sequentially, in parallel, or in one or more varied orders. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A system for validating anomaly events associated with a smart water grid, the system comprising:
   a processor coupled to a memory, the processor when executed configured to:
   receive (1) new pressure sensor data associated with a pressure sensor in a supply zone of a smart water grid and (2) new flow sensor data associated with a flow sensor in the supply zone of the smart water grid;
   compare the new pressure sensor data with a historical pressure trend pattern of the pressure sensor to identify a first significant turning point in the new pressure sensor data;
   compare the new flow sensor data with a historical flow trend pattern of the flow sensor to identify a second significant turning point in the flow sensor data;
   identify an overlapping time frame for the first significant turning point and the second significant turning point;
   determine that one or more first anomaly events that fall within the overlapping time frame are valid anomaly events for the smart water grid; and
   determine that one or more second anomaly events that fall outside the overlapping time frame are invalid anomaly events for the smart water grid.

2. The system of claim 1, wherein the processor is further configured to:
perform a statistical process control (SPC) method on the new pressure sensor data and the new flow sensor data to detect the one or more first anomaly events and the one or more second anomaly events.

3. The system of claim 1, wherein the processor is further configured to:
compute n-day moving average values from accumulated values of the new pressure sensor data; and
identify one or more turning points in the new pressure sensor data based on a multiplication of first-order differences of directly adjacent n-day moving average values.

4. The system of claim 3, wherein the processor is further configured to:
determine an upper bound and a lower bound based on a percentage value and a previous turning point that is a reference point; and
determine that a selected turning point is the first significant turning point based on the selected turning point being between the upper bound and the lower bound.

5. The system of claim 4, where the processor is further configured to:
calculate the upper bound ($TV_{upper}$) as:

$$TV_{upper} = TV_{ref} * (1 + TV_{threshold})$$

where $TV_{ref}$ is the reference point and $TV_{threshold}$ is the percentage value; and
calculate the lower bound ($TV_{lower}$) as:

$$TV_{lower} = TV_{ref} * (1 - TV_{threshold}).$$

6. The system of claim 1, wherein the overlapping time frame includes at least one flow increasing trend for the flow sensor and at least one pressure decreasing trend for the pressure sensor.

7. The system of claim 1, where the processor is further configured to:
determine a first sensor anomaly trend period for the pressure sensor based on a first actual turning time, a first detected time, and a defined time window, wherein the first sensor anomaly trend period has a first start time and a first end time;
determine a second sensor anomaly trend period for the flow sensor based on a second actual turning time, a second detected time, and the defined time window, wherein the second anomaly trend period has a second start time and a second end time; and
determine that the overlapping period is (1) a latest of the first start time and the second start time and (2) an earliest of the first end time and the second end time.

8. The system of claim 1, where the processor is further configured to:
when a duration from the first actual turning time ($AT_i$) to the first detected time ($DT_i$) is greater than the defined time window (TW), calculate the first start time as $DT_i - TW$ and calculate the first end time as $DT_i + TW$; and
when the duration from $AT_i$ to $DT_i$ is less than or equal to TW, calculate the first start time as $AT_i$ and calculate the first end time as $DT_i + TW$.

9. A method for validating anomaly events associated with a smart water grid, the method comprising:
receiving (1) new pressure sensor data associated with a pressure sensor in a supply zone of a smart water grid and (2) new flow sensor data associated with a flow sensor in the supply zone of the smart water grid;
comparing, by a software module executed by a processor, the new pressure sensor data with a historical pressure trend pattern of the pressure sensor to identify a first significant turning point in the new pressure sensor data;
comparing, by the software module, the new flow sensor data with a historical flow trend pattern of the flow sensor to identify a second significant turning point in the flow sensor data;
identifying, by the software module, an overlapping time frame for the first significant turning point and the second significant turning point;
determining, by the software module, that one or more first anomaly events that fall within the overlapping time frame are valid anomaly events for the smart water grid; and
determining, by the software module, that one or more second anomaly events that fall outside the overlapping time frame are invalid anomaly events for the smart water grid.

10. The method of claim 9, further comprising:
performing a statistical process control (SPC) method on the new pressure sensor data and the new flow sensor data to detect the one or more first anomaly events and the one or more second anomaly events.

11. The method of claim 9, further comprising:
computing n-day moving average values from accumulated values of the new pressure sensor data; and
identifying one or more turning points in the new pressure sensor data based a multiplication of first-order differences of directly adjacent n-day moving average values.

12. The method of claim 11, further comprising:
determining an upper bound and a lower bound based on a percentage value and a previous turning point that is a reference point; and
determining that a selected turning point is the first significant turning point based on the selected turning point being between the upper bound and the lower bound.

13. The method of claim 12, further comprising:
calculating the upper bound ($TV_{upper}$) as:

$$TV_{upper} = TV_{ref} * (1 + TV_{threshold})$$

where $TV_{ref}$ is the reference point and $TV_{threshold}$ is the percentage value; and
calculating the lower bound ($TV_{lower}$) as:

$$TV_{lower} = TV_{ref} * (1 - TV_{threshold}).$$

14. The method of claim 9, wherein the overlapping time frame includes at least one flow increasing trend for the flow sensor and at least one pressure decreasing trend for the pressure sensor.

15. The method of claim 9, further comprising:
determining a first sensor anomaly trend period for the pressure sensor based on a first actual turning time, a first detected time, and a defined time window, wherein the first sensor anomaly trend period has a first start time and a first end time;
determining a second sensor anomaly trend period for the flow sensor based on a second actual turning time, a second detected time, and the defined time window, wherein the second anomaly trend period has a second start time and a second end time; and
determining that the overlapping period is (1) a latest of the first start time and the second start time and (2) an earliest of the first end time and the second end time.

16. The method of claim 9, further comprising:
when a duration from the first actual turning time ($AT_i$) to the first detected time ($DT_i$) is greater than the defined time window (TW), calculate the first start time as $DT_i-TW$ and calculate the first end time as $DT_i+TW$; and
when the duration from $AT_i$ to $DT_i$ is less than or equal to TW, calculate the first start time as $AT_i$ and calculate the first end time as $DT_i+TW$.

17. A non-transitory computer readable medium having software encoded thereon, the software when executed by one or more computing devices operable to:
receive (1) new pressure sensor data associated with a pressure sensor in a supply zone of a smart water grid and (2) new flow sensor data associated with a flow sensor in the supply zone of the smart water grid;
compare the new pressure sensor data with a historical pressure trend pattern of the pressure sensor to identify a first significant turning point in the new pressure sensor data;
compare the new flow sensor data with a historical flow trend pattern of the flow sensor to identify a second significant turning point in the flow sensor data;
identify an overlapping time frame for the first significant turning point and the second significant turning point;
determine that one or more first anomaly events that fall within the is overlapping time frame are valid anomaly events for the smart water grid; and
determine that one or more second anomaly events that fall outside the overlapping time frame are invalid anomaly events for the smart water grid.

18. The non-transitory computer readable medium of claim 17, the software when executed by the one or more computing devices further operable to:
perform a statistical process control (SPC) method on the new pressure sensor data and the new flow sensor data to detect the one or more first anomaly events and the one or more second anomaly events.

19. The non-transitory computer readable medium of claim 17, the software when executed by the one or more computing devices further operable to:
compute n-day moving average values from accumulated values of the new pressure sensor data; and
identify one or more turning points in the new pressure sensor data based on a multiplication of first-order differences of directly adjacent n-day moving average values.

20. The non-transitory computer readable medium of claim 19, the software when executed by the one or more computing devices further operable to:
determine an upper bound and a lower bound based on a percentage value and a previous turning point that is a reference point; and
determine that a selected turning point is the first significant turning point based on the selected turning point being between the upper bound and the lower bound.

* * * * *

UNITED STATES PATENT AND TRADEMARK OFFICE
CERTIFICATE OF CORRECTION

PATENT NO. : 12,135,225 B1
APPLICATION NO. : 18/098419
DATED : November 5, 2024
INVENTOR(S) : Xue Meng et al.

Page 1 of 1

It is certified that error appears in the above-identified patent and that said Letters Patent is hereby corrected as shown below:

On the Title Page

Item (12) "Xue" should read -- Meng et al. --.

(72) Inventors reads: "Xue Meng Xue, Singapore (SG); Zheng Yi Wu, Watertown, CT (US); Alvin Chew Wei Ze Alvin Chew, Singapore (SG); Jianping Cai, Singapore (SG); Shu Hui Jocelyn Pok, Singapore (SG); Rony Kalfarisi, Singapore (SG)"

(72) Inventors should read: -- Xue Meng, Singapore (SG); Zheng Yi Wu, Watertown, CT (US); Wei Ze Alvin Chew, Singapore (SG); Jianping Cai, Singapore (SG); Shu Hui Jocelyn Pok, Singapore (SG); Rony Kalfarisi, Singapore (SG) --.

Signed and Sealed this
Twenty-ninth Day of July, 2025

Coke Morgan Stewart
*Acting Director of the United States Patent and Trademark Office*